Jan. 14, 1947.                  W. H. BRADLEY                    2,414,188
                                DRIVE MECHANISM
                         Original Filed March 25, 1943
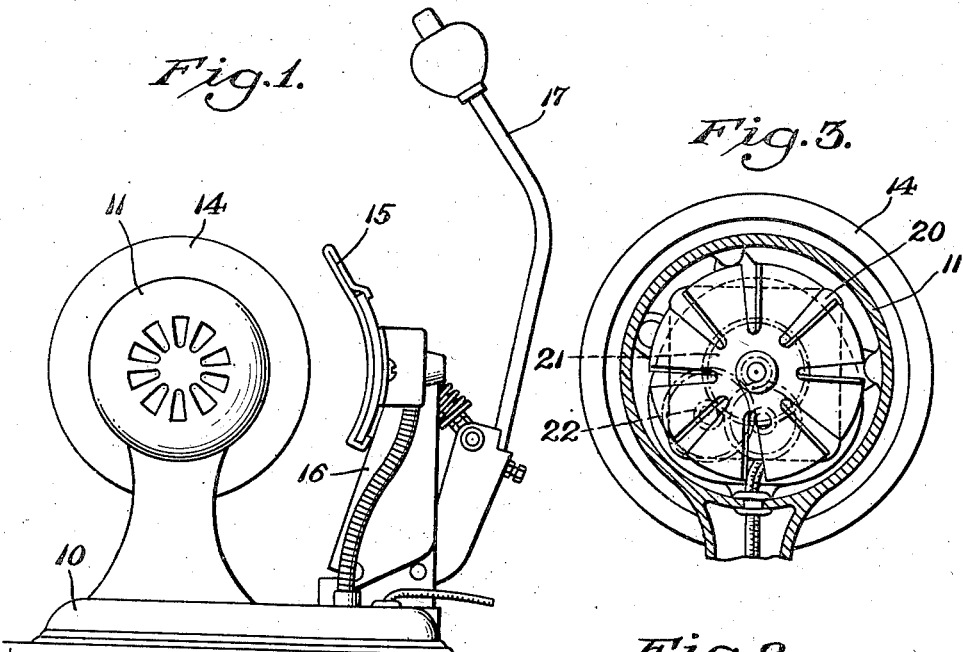
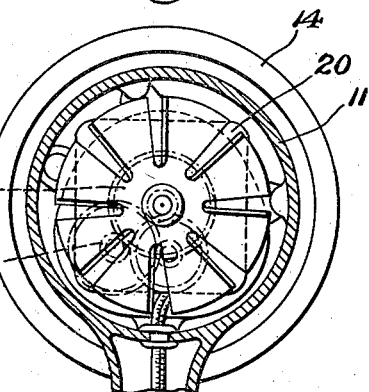
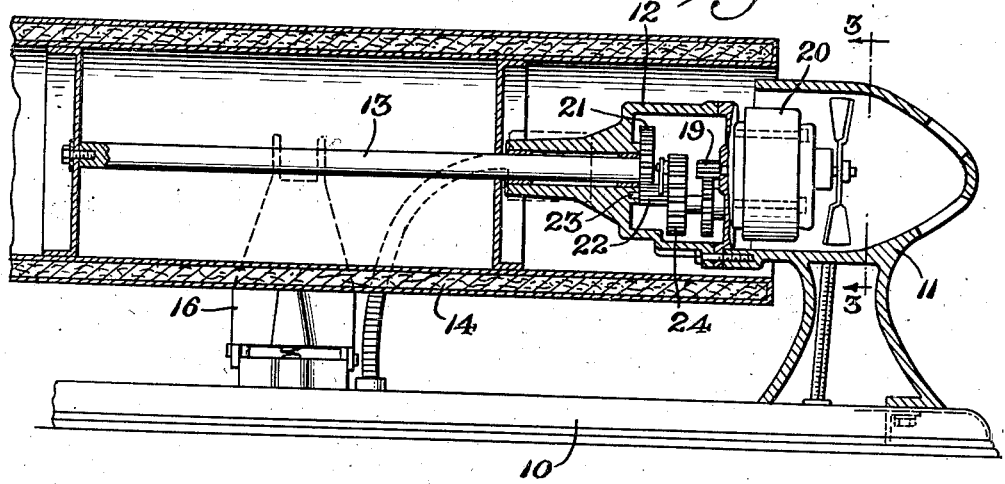
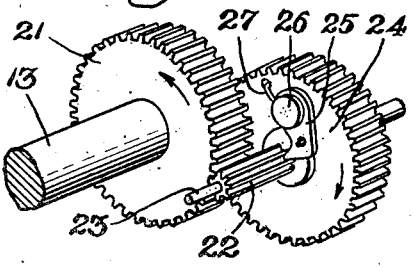
Inventor
William H. Bradley
BY
Davis, Lindsey, Smith & Morts
Attorneys.

Patented Jan. 14, 1947

2,414,188

UNITED STATES PATENT OFFICE 2,414,188

DRIVE MECHANISM

William H. Bradley, Fort Wayne, Ind., assignor to Horton Manufacturing Company, Fort Wayne, Ind., a corporation of Indiana Application March 25, 1943, Serial No. 480,433, which is a division of application Serial No. 341,220, June 19, 1940. Divided and this application June 23, 1944, Serial No. 541,717

2 Claims. (Cl. 38—60)

The invention relates generally to drive mechanisms and more particularly to a drive mechanism for operating a roll in an ironing machine.

This application is a division of my copending application, Serial No. 480,433, filed March 25, 1943, which latter application was a division of my application, Serial No. 341,220, filed June 19, 1940, now matured into Patent No. 2,338,163, issued January 4, 1944.

The general object of the invention is to provide a novel drive mechanism for an ironing machine of the type having a pair of cooperating ironing elements, one of which is a roll, which drive mechanism connects the drive motor of the machine with the roll in such a manner that the roll may be easily turned forwardly by hand to facilitate placing an article between the two ironing elements.

Another object is to provide a novel drive mechanism in which the connection between the driving and driven members includes a simplified pawl and ratchet, permitting the driven member to be manually turned forwardly and accomplishing the desired drive with a minimum number of parts.

Other objects and advantages will become apparent in the following description taken in connection with the accompanying drawing, in which:

Figure 1 is an end elevational view of an ironing machine provided with a drive mechanism embodying the features of the invention.

Fig. 2 is a longitudinal vertical sectional view of the machine shown in Fig. 1.

Fig. 3 is a vertical sectional view taken on the line 3—3 of Fig. 2.

Fig. 4 is a perspective view of a portion of the drive mechanism.

A drive mechanism of the character herein disclosed is such as to provide a gear reduction from a relatively high speed electric motor to a driven shaft operating at a substantially lower speed, and its chief characteristic is to provide a one-way driving connection in the gearing which permits the driven member to be manually rotated in a forward direction when the motor is stopped. A drive mechanism of this character finds particular use in an ironing machine of the household type. Such a machine usually comprises a pair of ironing elements, one of which is a roll. In the use of such machine the operator frequently places an article to be ironed upon the roll and rotates the roll manually to move the article into ironing position. Without a one-way driving connection in the mechanism, the entire drive mechanism, as well as the motor, would have to be rotated, if the roll were to be manually rotated, and because of the large amount of reduction in speed between the motor and the roll, the force required to manually rotate the roll would practically prohibit use of the machine in this manner. On the other hand it is undesirable to permit the roll to be manually rotated too freely.

In the drawing, an ironer is shown for purposes of illustration, which comprises a base 10 having a head 11 at one end thereof. The head 11 supports a gear casing 12, and extending from the gear casing is a roll supporting shaft 13. The roll, indicated at 14, is one of a pair of cooperating ironing elements, the other of which in the present instance is shown as a shoe 15 supported for shifting movement toward and from the roll 14 by means of a pivoted arm 16. Such shifting movement of the shoe 15 is effected, in the present instance, by means of a hand lever 17.

In the machine illustrated in the drawing, the gear casing 12 is positioned within the roll 14 and is supported by the head 11. The gear casing 12 carries a motor 20 located preferably within the head 11. Within the gear casing 12 is gearing connecting the motor 20 with the roll shaft 13, and in the operation of the machine the motor is adapted to operate only during the time when the shoe 15 is in operative relation with the roll 14, a switch (not shown) being provided in motor circuit for stopping the motor as an incident to movement of the shoe 15 away from the roll. The shaft of the motor 20 extends into the gear casing 12 and on its inner end is provided with a pinion 19 adapted to drive gearing connected to the roll shaft 13, the latter extending into the casing for such connection.

In the operation of an ironing machine, it is desirable to be able to freely rotate the roll in a forward direction by hand either when the roll is stopped or when it is being driven by the motor. Thus when an article to be ironed is placed upon the roll, it is sometimes more convenient to place the advance edge of the article along the top of the roll where it may be smoothed out by hand before coming in contact with the shoe. It is then frequently desirable to turn the roll by hand forwardly to bring the edge of such article into the space between the roll and the shoe before the shoe is shifted into operative relation, to avoid the chance of the article being wrinkled when first engaged by the shoe. If the article is clamped against the roll by the shoe after it has been moved into the ironing area, it will usually continue to be drawn into such area without chance of wrinkling. While relatively free rotation of the roll is desired as described above, still the roll should not be so free as to rotate at the slightest touch.

In the present instance such mode of operation of the machine is permitted since the driving mechanism is of the one-way type so that the roll may be freely turned forwardly. Since the gear casing 12 is mounted within the roll, it is desirable to provide as compact a gearing or drive mechanism as possible. Moreover, the simpler the gearing can be and still accomplish the desired flexibility of operation, the less expensive it is to manufacture the mechanism. In the present instance the one-way drive is in the form of a pawl and ratchet device of extremely simple character and having a minimum number of parts.

Specifically, the gearing or drive mechanism for driving the roll includes a driven gear 21 mounted on the end of the roll shaft 13 and located within the gear casing 12. Meshing with the gear 21 is a pinion 22 carried on a stub shaft 23 journaled in the wall of the gear casing. Also mounted on the stub shaft 23 is a drive gear 24 positioned in a plane spaced from the plane of the gear 21 and connected through other speed reducing gears with the motor pinion 19.

The gear 24 is adapted to be secured in driving relation with the pinion 22 by means of a pawl and ratchet connection providing the one-way drive. To simplify the construction, the pinion 22 is substantially longer than is necessary merely to mesh with the gear 21 in order to provide a portion extending into the space between the gears 21 and 24 and adjacent the gear 24. Mounted on the adjacent face of the gear 24 by means of a pivot pin 26 is a pawl 25 which is urged toward the extending portion of the pinion 22 by means of a torsion spring 27 anchored at its ends to the gear 24 and the pawl 25. The pawl 25 thus engages between the teeth of the pinion 22 to utilize the latter as a ratchet and thereby effect a driving relation.

In operation, when the drive gear 24 rotates in the direction indicated by the arrow in Fig. 4, the pawl 25 engages the pinion and provides a driving relation therewith to effect rotation of the roll shaft 13 through the gear 21. When the roll is rotated forwardly by hand, the pinion 22 is rotated in such direction as to force the pawl 25 out of the way against the pressure of the spring 27, thus permitting the roll to be freely turned without rotating the entire gearing and the motor. However, the gear ratio between the gear 21 and the pinion 22 as well as the drag of the pawl 25 on the pinion produce sufficient friction to prevent the roll from being rotated at the slightest touch. Thus, the roll may be manually rotated when desired and to the extent desired but will stop when the hand is removed from the roll. This obviously assists in placing an article to be ironed in between the roll and the shoe.

The pinion 22 may be manufactured in a length sufficient to provide both meshing with the gear 21 and engagement with the pawl 25 at a very slight increase in cost over the cost of a pinion long enough merely to mesh with the gear 21. The cost of a separate ratchet is thereby eliminated and the number of parts in the drive mechanism is consequently reduced. Thus, I have provided a novel drive mechanism including a simplified pawl and ratchet connection permitting rotation of the driven part manually when the motor is stopped.

I claim:

1. In an ironing machine, the combination of a roll shaft, a driven gear mounted on said roll shaft, a stub shaft provided with an elongated pinion, a portion of which meshes with said driven gear, a drive gear loosely mounted on said stub shaft adjacent said pinion, and a one-way driving device carried by said drive gear and arranged for one-way driving engagement with another portion of said pinion, the gear ratio between said pinion and said driven gear being such that manual rotation of the roll will cause relatively fast rotation of the pinion, and the friction of the latter will tend to quickly stop the rotation when the hand is removed from the roll.

2. In an ironing machine, roll driving mechanism comprising a roll shaft, a roll gear rigidly mounted on said shaft, a pinion meshing with said roll gear and projecting beyond one face thereof, a drive gear coaxial with said pinion, and a spring-pressed pawl carried by said drive gear and engaging the projecting portion of said pinion to provide a one-way driving connection with said pinion but permitting rotation of the pinion by manual rotation of the roll shaft, the friction resulting from the rotation of said pinion and the drag of said pawl on said pinion tending to stop rotation of the roll when the hand is removed therefrom.

WILLIAM H. BRADLEY.